Oct. 18, 1927.
C. A. HOXIE
NARROW LIGHT APERTURE
Filed Dec. 22, 1926
1,646,249
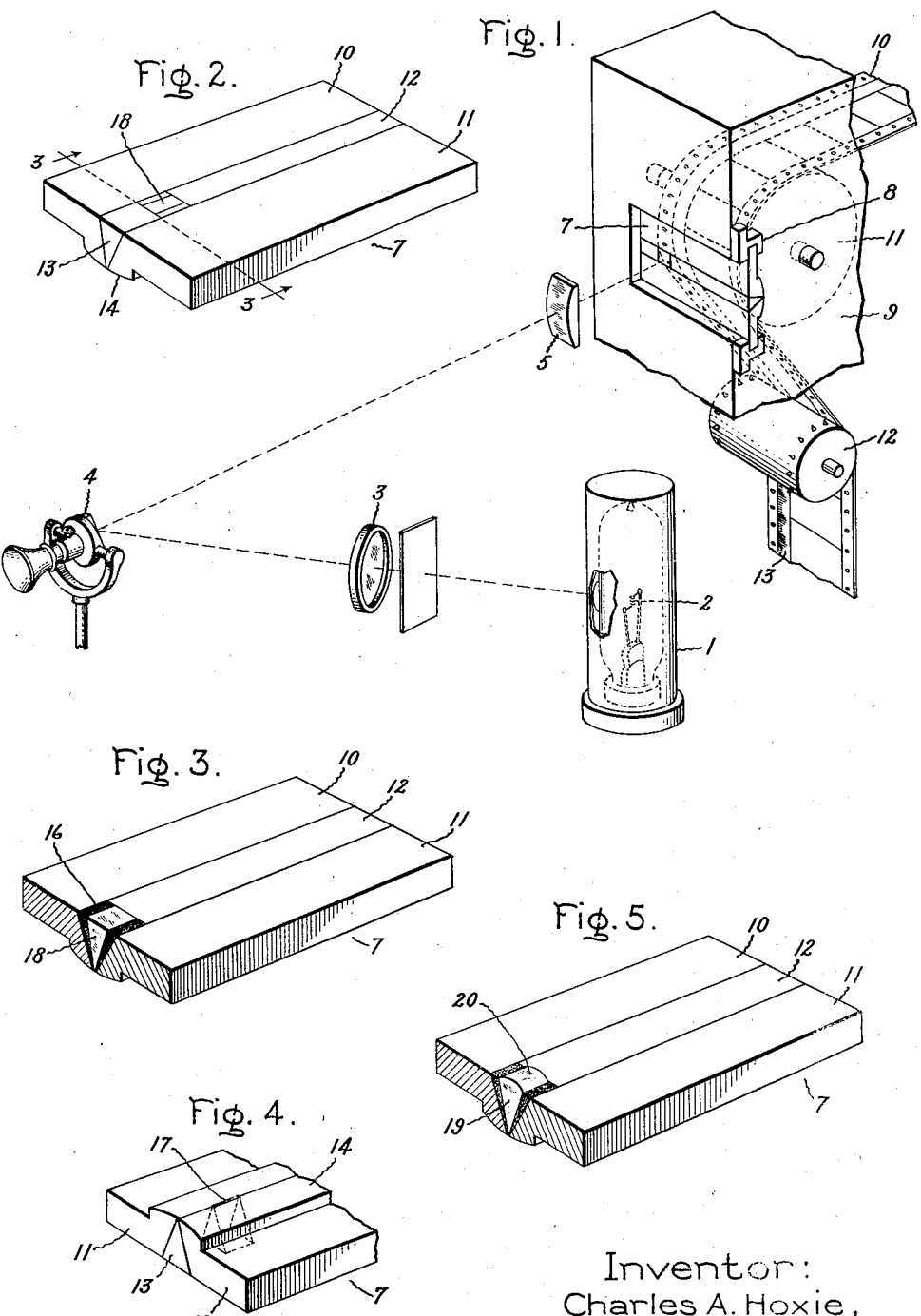
Inventor:
Charles A. Hoxie,
by *Alexander S. [illegible]*
His Attorney.

Patented Oct. 18, 1927.

1,646,249

UNITED STATES PATENT OFFICE.

CHARLES A. HOXIE, OF SCHENECTADY, NEW YORK, ASSIGNOR TO GENERAL ELECTRIC COMPANY, A CORPORATION OF NEW YORK.

NARROW LIGHT APERTURE.

Application filed December 22, 1926. Serial No. 156,509.

My invention relates to apparatus for photographically recording sound on films and reproducing the sound therefrom, and particularly to that part of the apparatus which provides a narrow light aperture through which light is allowed to pass to the film when a sound record is being made and through the film to a photo-electric device when the sound is being reproduced. An object of my invention is to provide an improved light aperture device having a rugged construction which shall not be difficult to manufacture and which shall provide a sharp, clean cut light aperture of the desired narrow width, located close to the face of the device over which the film passes, and which shall not collect dust and dirt in the aperture.

My invention will be better understood from the following description taken in connection with the accompanying drawing, and its scope will be pointed out in the appended claims.

Referring to the drawing, Figure 1 shows the general arrangement of apparatus for making a photographic sound record including a light aperture device embodying my invention; Fig. 2 is an enlarged perspective view of the light aperture device; Fig. 3 shows a cross-section of the device on line 3—3 of Fig. 2; Fig. 4 is a fragmentary view of the device inverted; and Fig. 5 is a view similar to Fig. 3 showing a modification.

In Fig. 1 of the drawing I have shown an arrangement of apparatus similar to that illustrated in my Letters Patent No. 1,598,377 granted to General Electric Company on August 31, 1926, except that a single light beam is used, the beam which falls on the film being the same beam which is vibrated by the sound actuated device. The source of light 1 shown as an electric lamp having a concentrated filament 2 is arranged so that a light beam therefrom after passing through the condensing lens 3 falls on the small vibratory mirror (not shown) of the sound actuated device 4. The beam reflected by the mirror and concentrated vertically by the cylindrical lens 5 is directed on the aperture device 7 which is shown mounted to slide in a guide 8 forming part of an enclosing casing 9 for the photographic film 10. The film passes over the drum 11 opposite the aperture device 7 and is driven by suitable sprocket wheels, one of which is shown at 12. It is arranged to run as close as possible to the rear convex face of the aperture device without actual contact therewith. I have illustrated the film as one having a picture record and a sound record at the side thereof at 13 although if desired the film may carry only the sound record which may be formed in one or in a plurality of parallel rows on the film.

For exposing the film to make a sound record the light beam reflected by the sound responsive device 4 is vibrated horizontally or at right angles to the direction of movement of the film and reaches the film only after passing through a very narrow aperture in the aperture device 7 also arranged at right angles to the direction of movement of the film. It is desirable for the proper recording of the light beam vibrations and also for the proper reproduction of the sound that the aperture through which light is admitted to the film shall be extremely narrow. Best results at present are obtained with a width of not more than 1 mil. It is also important that the aperture have sharply defined edges located very close to the moving film. Some of the difficulties heretofore experienced in constructing narrow light apertures have been to bring the aperture and the moving film sufficiently close together, to avoid destructive wear of the material in which the aperture is formed and to prevent the accumulation of dust and dirt in the aperture from the passing film.

Attempts have been made to construct a narrow quartz filled aperture where the aperture had a uniform thickness of about 1 mil. When the quartz filler of such extreme thinness was clamped between the plates of the holder and the surfaces of the holder at the aperture were ground off, it was found difficult to prevent cracking of the quartz. In accordance with my invention I employ a quartz member for transmitting the light but make it of a more sturdy construction. I make it wedge-shaped with the edge of the wedge having the desired width of the aperture and the base of the wedge relatively broad. This has the two-fold advantage of giving the quartz member greater sturdiness or strength and of admitting more light.

In Figs. 2, 3 and 4 I have shown the aperture device 7 greatly enlarged and for convenience of manufacture as comprising two similar plates 10 and 11 arranged side by side and preferably of steel. The adjacent sides of the plates are shown beveled so as to form a wedge-shaped slot which for the greater part of its length is filled with wedge-shaped members 12 and 13 which also may be of steel and to which the plates are firmly secured. The plates at one side are shown having extensions 14, the outer face of which is convex. The wedge-shaped space 16 left between the members 12 and 13 terminates at its apex in a narrow slot or aperture 17 which preferably is not more than one mil in width, the two plates being suitably ground away at this point to provide this width of opening.

A carefully ground transparent member 18, preferably of quartz, in the form of a wedge having a relatively broad base and having an edge of not more than one mil in width is placed in the opening 16 with its edge substantially flush with the convex face. The angle of the wedge-shaped slot between the plates 10 and 11 is made materially greater than the angle of the quartz wedge so that while the wedge is held in proper position in the slot, a suitable bonding material, which I shall refer to as cement in the appended claims, is put down on each side of the wedge, thereby firmly securing it in the holder. I preferably polish both the narrow edge face and the broad rear face of the quartz wedge before securing it in the holder. However, after it has been fixed in the holder, I smooth or polish off the convex face in order that this face and the edge of the quartz wedge shall be exactly flush with each other. I have found a suitable bonding material or cement for this purpose to be silicate of soda. This material withstands the heat to which it is subjected by the light beam and does not draw over the face of the quartz wedge when it is subsequently polished. As stated above, the base of the quartz wedge is relatively broad. Quartz wedges having a wedge angle of 45 degrees have given very good results. A wedge having such a wedge angle does not easily break and permits the passage of a relatively large quantity of light. In this connection it should be noted that the light rays entering the aperture from the cylindrical lens 5 are in the form of a wedge-shaped or tapering beam.

With the aperture device 7 thus described in operative position the film is carried past the polished convex face with a clearance preferably of not over one-half a mil and since the light aperture 17 is mechanically filled and flush with the face there is no opportunity for dust and dirt to collect at this point. The edge of the light aperture also is at the surface over which the film travels and by reason of the wide angle of the aperture light from substantially the full width of the light beam is received.

In the modified form illustrated by Fig. 5 the aperture device 7 has the quartz wedge 19, the large end of which is given a convex cylindrical surface 20, thereby to bend the light rays toward the narrow aperture.

What I claim as new and desire to secure by Letters Patent of the United States, is:—

1. A light aperture device comprising a member having a broad wedge-shaped opening therein, a wedge-shaped transparent member having a relatively broad base and a wedge angle materially less than the wedge angle of said opening seated in the opening, and cement filling the spaces on either side of the member.

2. A light aperture device comprising a plate having a wedge-shaped opening therein and a convex face into which opens the narrow end of said opening, a transparent wedge-shaped member having a relatively wide wedge angle cemented in said opening, the edge of the wedge-shaped member being flush with the convex face of said plate.

3. A light aperture device comprising a plate having a relatively broad wedge-shaped opening therein terminating at one side of the plate in an aperture substantially one mil in width, a quartz wedge having a wedge angle of substantially forty-five degrees arranged in said opening with its edge in said aperture, the angle of said opening being materially greater than the angle of the quartz wedge, and cement filling the spaces on opposite sides of the quartz wedge.

4. A light aperture device comprising a plate formed of a pair of complementary strips having their adjacent faces beveled to form a wedge-shaped opening therebetween, and having projecting portions providing a convex surface on the side corresponding to the narrow portion of the wedge shaped opening, a quartz wedge having a sharp edge and relatively broad base cemented in said opening with its edge flush with the convex surface of said plates.

In witness whereof, I have hereunto set my hand this 20th day of December, 1926.

CHARLES A. HOXIE.